United States Patent
Lizzi et al.

(10) Patent No.: US 8,381,625 B2
(45) Date of Patent: Feb. 26, 2013

(54) CIRCULAR SAW BLADE WITH CUTTING TIPS MECHANICALLY LOCKED AGAINST MULTIPLE FORCE VECTORS

(75) Inventors: Davide Lizzi, Maiano (IT); Russell Thomas Kohl, Jacksonville, FL (US); Frederick Clifford Paddock, Jamestown, NC (US)

(73) Assignee: Freud America, Inc., High Point, NC (US)

( * ) Notice: Subject to any disclaimer, the term of this patent is extended or adjusted under 35 U.S.C. 154(b) by 209 days.

(21) Appl. No.: 12/706,398

(22) Filed: Feb. 16, 2010

(65) Prior Publication Data

US 2011/0197736 A1     Aug. 18, 2011

(51) Int. Cl.
    *B23D 61/04* (2006.01)
(52) U.S. Cl. ......................................... 83/835
(58) Field of Classification Search ............... 83/835, 83/697, 848, 839, 852, 840, 854, 855, 676
    See application file for complete search history.

(56) References Cited

U.S. PATENT DOCUMENTS

| | | | | |
|---|---|---|---|---|
| 246,703 A * | 9/1881 | Atkins | .............. | 83/845 |
| 416,094 A * | 11/1889 | Day | .............. | 83/836 |
| 2,964,078 A * | 12/1960 | Proctor | .............. | 144/162.1 |
| 3,169,435 A | 2/1965 | Hartger | | |
| 3,885,488 A * | 5/1975 | Evancic et al. | .............. | 83/835 |
| 4,114,494 A * | 9/1978 | Budke et al. | .............. | 83/835 |
| 4,417,833 A * | 11/1983 | Wertheimer | .............. | 407/61 |
| 4,492,140 A * | 1/1985 | Pano | .............. | 83/839 |
| 5,794,503 A | 8/1998 | Asada | | |
| 5,829,423 A * | 11/1998 | Benz | .............. | 125/15 |
| 5,829,924 A * | 11/1998 | Oshnock et al. | .............. | 407/110 |
| 5,896,800 A * | 4/1999 | Curtsinger et al. | .............. | 83/835 |
| 7,163,361 B2 * | 1/2007 | Hecht | .............. | 407/109 |
| 7,240,597 B2 | 7/2007 | Sakai et al. | | |
| 2006/0243115 A1 * | 11/2006 | Sakai et al. | .............. | 83/853 |
| 2007/0095190 A1 | 5/2007 | Asada | | |

FOREIGN PATENT DOCUMENTS

| | | |
|---|---|---|
| DE | 202006011952 U1 | 11/2006 |
| JP | 62039113 A | 2/1987 |
| WO | 2005005086 A1 | 1/2005 |

OTHER PUBLICATIONS

European Search Report from European Patent Office in regards to European Patent Application 10192347.2.
Freud catalog pp., 2009.
Circular saw—Wikipedia, the free encyclopedia, http://en.wikipedia.org/w/index, Oct. 8, 2009, pp. 1-4.
Carbide Saw Blade Anatomy, "Saw Blade Components and Tip Configurations," Oldham, www.oldham-usa.com/products/SawMain/Terms/carbideSBcomponents.htm, Oct. 8, 2009, pp. 1-7.

* cited by examiner

*Primary Examiner* — Ghassem Alie
(74) *Attorney, Agent, or Firm* — K&L Gates LLP

(57) ABSTRACT

A circular saw blade includes a substantially planar main body having an essentially circular periphery in which are formed a plurality of annularly spaced tip support portions, and a plurality of cutting tips affixed by brazing to the tip support portions of the main body. Each cutting tip has a mounting base formed with at least two locking surfaces along which the brazing affixes the mounting base to a respective tip support portion. The locking surfaces are configured and located in relation to one another and to the main body for counteracting forces which act against the cutting tip in differing directions in the plane of the main body during rotational cutting operation of the blade.

1 Claim, 3 Drawing Sheets

CIRCULAR SAW BLADE WITH CUTTING TIPS MECHANICALLY LOCKED AGAINST MULTIPLE FORCE VECTORS

FIELD OF THE INVENTION

The present invention relates generally to circular saw blades and, more particularly, to circular saw blades wherein cutting tips, typically of a carbide material, are affixed, typically by brazing, to the circumferential periphery of the body of the saw blade.

BACKGROUND OF THE INVENTION

Circular cutting saws are well-known and widely employed in the construction, woodworking and like industries. Such saws are of various types, ranging from larger stationary apparatus, e.g., apparatus of the type sometimes referred to as table saws, to portable hand held saws. All such saws have in common the use of a circular saw blade rotatably supported in association with a drive motor to be driven about a central axis. Circular saw blades commonly have a substantially flat planar main body with an essentially circular circumferential periphery about which multiple cutting teeth are spaced such that, upon driven rotation of the saw blade, the teeth perform a cutting operation on wood or other material to which the blade is applied.

The main body of circular saw blades is typically made of a hardened metal alloy, most commonly a steel alloy. The cutting teeth of circular saw blades may be formed integrally as a part of the periphery of the main blade body or may be in the form of tips of a different harder material affixed rigidly to the periphery of the main body, for example, by a brazing process. The cutting tips in tipped saw blades are most commonly made of a carbide material because of its greater hardness and improved ability to maintain a sharpened edge over longer periods of use. The use of cutting tips also enables a greater variety of cutting edge shapes and geometries to be utilized than is typically possible with cutting teeth formed integrally with the main body of the saw blade.

While the provision of cutting tips offers these described advantages, the use of cutting tips also poses the challenge of ensuring that the tips are affixed to the blade body securely enough to resist being loosened or removed altogether under the effect of various forces acting on the tips in differing directions during cutting operations. Various proposals have been made in the industry to address this issue. For example, U.S. Pat. No. 5,794,503 proposes a specialized tip configuration intended to increase the strength of the bonding of the tip to the main blade body via brazing. This development still suffers certain drawbacks. First, the tip configuration is incompatible with typical conventional brazing equipment, thereby requiring specialized brazing machinery to accomplish the intended bonding of the tip to the blade body. Second, the tip configuration, when affixed to the blade body, is effective primarily only in resisting forces generally tangential to the blade periphery, but not forces in a generally radial direction.

Hence, there continues to exist a need in the industry for an improved saw blade with a tip configuration which can be secured using existing conventional brazing equipment and which also is effective to counteract forces acting on the saw blade in differing directions, in particular, both radial and tangential.

SUMMARY OF THE INVENTION

Briefly summarized, the present invention is basically applicable to essentially any circular saw blade comprising (a) a substantially planar main body having an essentially circular periphery in which are formed a plurality of annularly spaced tip support portions, and (b) a plurality of cutting tips affixed by brazing to the tip support portions of the main body. In accordance with the present invention, each cutting tip has a mounting base formed with at least two locking surfaces along which the brazing affixes the mounting base to a respective tip support portion to form respectively at least two mechanical locks on the cutting tip. The locking surfaces are configured and located in relation to one another and to the main body for counteracting multiple forces which act against the cutting tip in differing directions in the plane of the main body during rotational cutting operation of the blade. Advantageously, the cutting tips of the present invention can be secured to the main body using conventional brazing equipment.

Various configurations and embodiments of the present invention are contemplated to be possible. For example, but without limitation, one of the locking surfaces may comprise a recessed area in the mounting base of the cutting tip, while another of the locking surfaces may comprise a protruding area in the mounting base of the cutting tip. The recessed area may comprise a curvilinear concavity in the mounting base of the cutting tip, e.g., a circular concavity having a radius of about 0.2 mm or greater. The protruding area may comprise a curvilinear convexity in the mounting base of the cutting tip, e.g., a circular convexity having a radius of between about 0.2 mm and about 1.0 mm. As used herein, the term "curvilinear" is intended to mean and to encompass any extending surface formed of any combination of curving and/or linear surfaces that collectively form a concave-like recess or a convex-like protrusion.

Each cutting tip comprises a cutting edge. In many contemplated embodiments, the two locking surfaces are preferably disposed generally opposite the cutting edge. Each tip support portion may advantageously comprise two locking surfaces which are configured to mate with the locking surfaces of the respective cutting tip, e.g., a recessed area such as a curvilinear concavity and a protruding area such as a curvilinear convexity in the tip support portion to receive the protruding and recessed areas of the respective cutting tip.

DETAILED DESCRIPTION OF THE PREFERRED EMBODIMENTS

Figure 1:
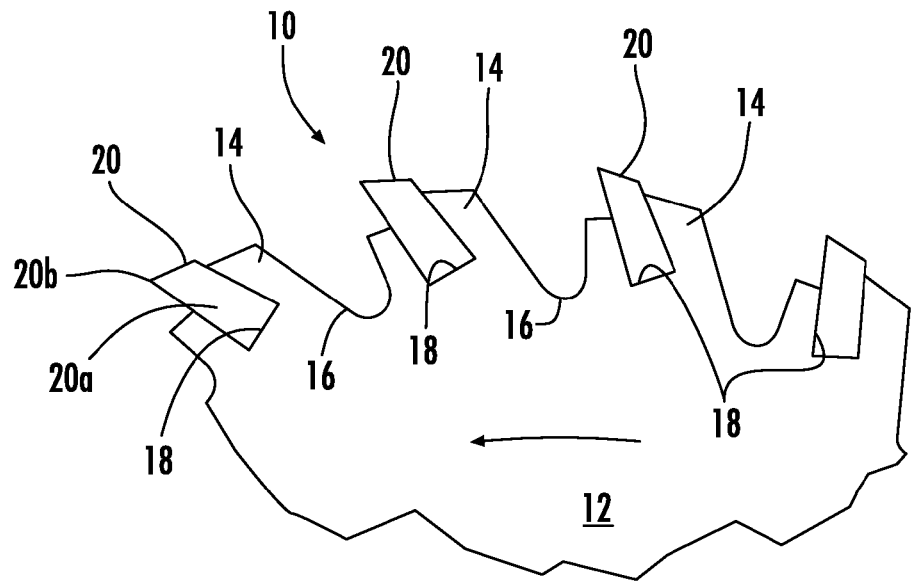
FIG. 1 is a fragmentary side elevational view of a circular saw blade with plural peripheral cutting teeth in accordance with one known form of prior art construction.
Figure 2:
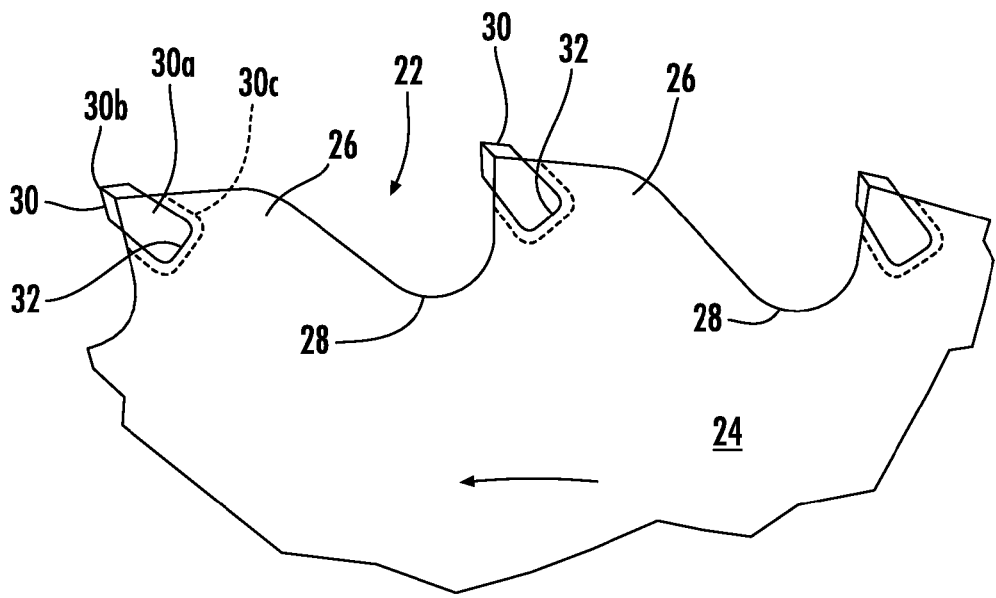
FIG. 2 is another fragmentary side elevational view, similar to FIG. 1, of a circular saw blade with plural peripheral cutting teeth in accordance with another known form of prior art construction.

Referring now to the accompanying drawings and initially to FIGS. 1 and 2, two differing forms of known prior art circular saw blades are shown. In FIG. 1, the saw blade is indicated overall by the reference numeral 10 and comprises a main planar blade body 12 having a plurality of tip support portions 14 spaced apart about the circumferential periphery of the body 10, separated by intervening peripheral recesses 16, commonly referred to as gullets. Each tip support portion 14 of the blade body 12 is formed with a respective groove 18 configured to taper inwardly. A plurality of hardened carbide cutting tips 20 are respectively attached by brazing to the tip support portions 14 via shank portions 20a of a complementary shape to the grooves 18 to be received in the grooves 18. The radially outwardly extending edges of the tips 20 are sharpened to form cutting edges 20b.

In FIG. 2, a saw blade according to U.S. Pat. No. 5,794,503 is indicated overall at 22. The saw blade 22 similarly comprises a main planar blade body 24 with a plurality of tip support portions 26 and intervening recesses or gullets 28 spaced about the periphery of the body 10. A plurality of hardened carbide cutting tips 30 are received in recesses 32 formed respectively in the tip support portions 26. Each tip 30 has a shank portion 30a that is received in the respective recess 32 and a cutting edge portion 30b that extends peripherally beyond the ends of the recesses 32 and beyond the tip support portions 26. The shank portion 30a of each tip 30 is formed with a flange 30c on one side thereof which abuts with a side surface of the tip support portion 26 of the blade body 24. The flange 30c is intended to provide an increased amount of surface area for brazing of the tip 30 to the blade body 24, so as to provide a mechanical interlocking of the tip 30 to the blade body 24.

In the case of each of the prior art saw blades of FIGS. 1 and 2, the configuration of the cutting tips in conjunction with the recesses in which the tips are secured will be recognized and understood by persons skilled in the art to provide only one form of mechanical locking effective against forces acting in only one direction. Moreover, in each form of saw blade, the tips are difficult to braze to the blade body using conventional industry brazing equipment.

Figure 3:
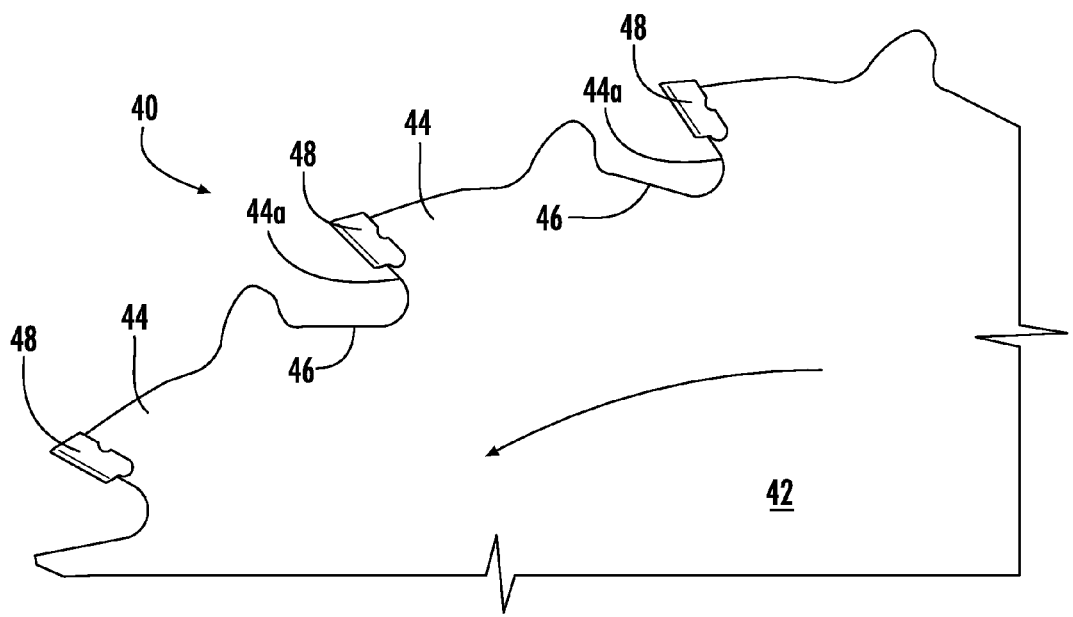
FIG. 3 is another fragmentary side elevational view of a circular saw blade with plural peripheral cutting teeth in accordance with the present invention.
Figure 4A:
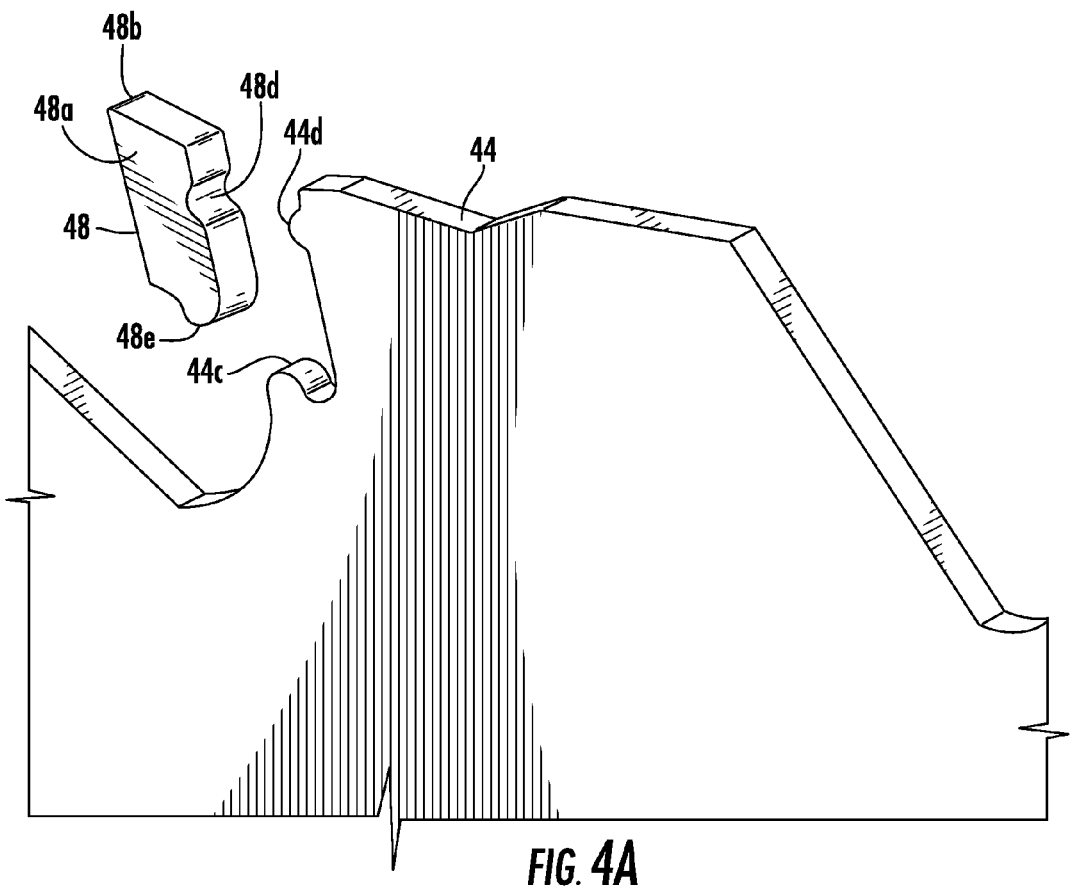
FIGS. 4A and 4B are an exploded fragmentary perspective views of one cutting tip at one tip support location of the circular saw blade of FIG. 3.
Figure 4B:
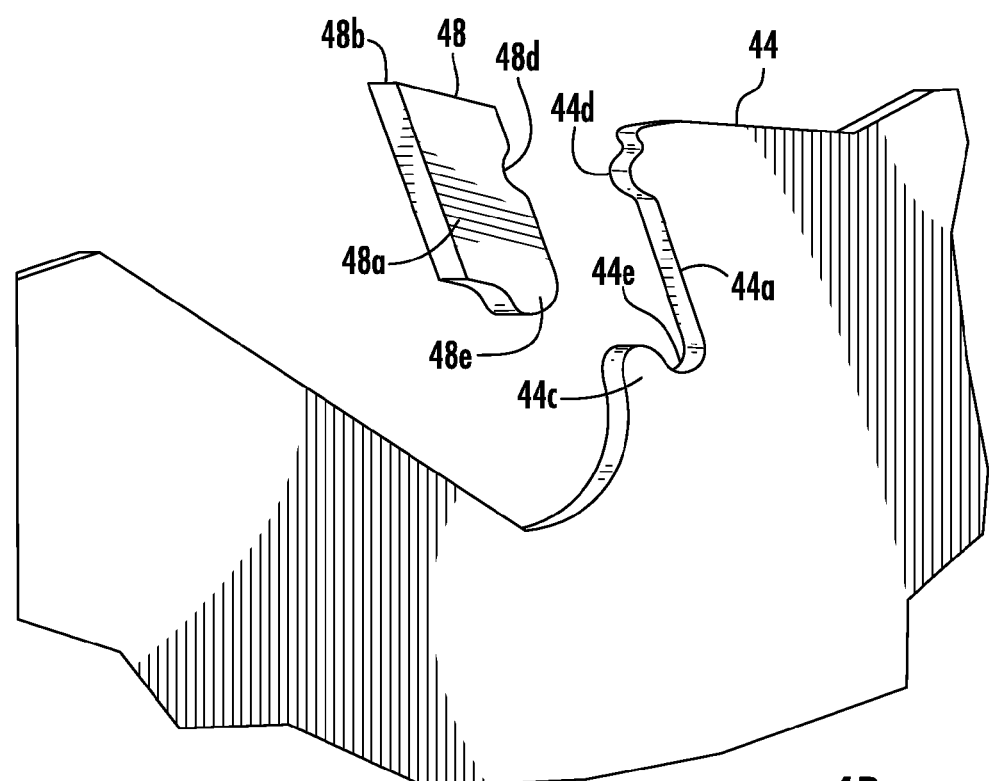
Figure 5:
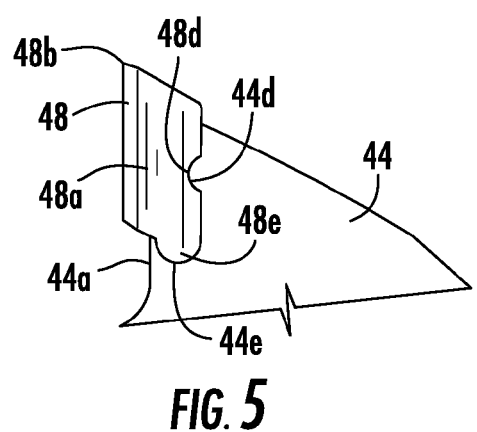
FIG. 5 is a side elevational view of the cutting tip and tip support location of FIG. 4, with the tip brazed to the support location.

Turning now to FIGS. 3-5, a saw blade in accordance with the present invention is indicated overall at 40. The saw blade 40 basically comprises a substantially flat planar main body 42, preferably formed of plate metal of a hardened steel alloy, with an essentially circular periphery in which are formed a plurality of annularly spaced tip support portions 44 spaced uniformly apart from one another by a corresponding plurality of intervening recesses, or gullets, 46. A respective cutting tip 48 is affixed, preferably by brazing, to the forward leading side 44a of each tip support portion 44 (as viewed in the direction of rotation of the saw blade, indicated by the directional arrow in FIG. 3).

By contrast to the saw blades of FIGS. 1 and 2, each tip support portion 44 and each cutting tip 48 are of a particular novel mating configuration providing at least two locking surfaces along which the brazing affixes the tip 48 to its respective tip support portions 44. More specifically, as best seen in FIGS. 4A, 4B, and 5, each cutting tip 48 has a main body 48a forming a mounting base, with a sharpened cutting edge 48b at one end of the main body 48a. The main tip body 48a is formed centrally along its length and generally opposite the cutting edge 48b with a recess 48d, in this embodiment in the form of a curvilinear concave recess, preferably a circular concavity of a radius in the range of about 0.2 mm or greater. Further, the end of the main tip body 48a opposite the cutting edge 48b is formed with a protruding portion 48e, in the illustrated embodiment in the form of a curvilinear convex protrusion, preferably a circular convexity of a radius between about 0.2 mm and about 1.0 mm.

Similarly, the leading side 44a of each tip support portion 44 is formed adjacent its radially outermost end with a protruding portion 44d, in the illustrated embodiment in the form of a curvilinear convex protrusion substantially mating with the curvilinear concave recess 48d of the cutting tip 48. The leading side 44a of each tip support portion 44 is further formed at a radially inward spacing therealong with a shoulder 44c in which is formed a recessed portion 44e, in the illustrated embodiment in the form of a curvilinear concavity substantially mating with the curvilinear convex protrusion 48e of the cutting tip 48. The main body 48a of each cutting tip 48 is preferably of a slightly wider dimension that the widthwise thickness of the blade body 42, thereby providing a relief of each cutting tip 48 laterally of the blade body 42, which facilitates the brazing of the tips 48 to the tip support portions 44.

In brazing the tips 48 to the main blade body 42, the brazing follows the configuration of the main tip body 48a and, in particular, follows the mating recesses and protrusions 44d, 48d and 44e, 48e. In this manner, the recesses and protrusions 44d, 48d and 44e, 48e serve as locking surfaces which, together with the brazing, form multiple mechanical interlocks for each respective cutting tip 48. Owing to the differing respective relative configurations (a concavity or other recess and a convexity or other protrusion) and the respective relative locations of the recesses and protrusions 44d, 48d and 44e, 48e at the side and end of each tip 48, the locking surfaces formed by the mated recesses and protrusions 44d, 48d and 44e, 48e are uniquely effective in conjunction with one another for counteracting forces which act against the cutting tip in differing directions in the plane of the main blade body during rotational cutting operation of the saw blade. For example, as schematically depicted in FIG. 5, the mechanical locks created by the recesses and protrusions 44d, 48d and 44e, 48e act in opposition against both radially inward and outward force vectors and against tangential force vectors, as well as against inward and outward force vectors in angular directions therebetween. In addition, because the brazing of the tips 48 to the main blade body 42 must only follow the edges of the main tip body 48a in the plane of the blade body 42, the tips 48 may be brazed without difficulty using conventional industry standard brazing equipment, without the need for any specialized machinery or accessories.

While the saw blade of the present invention has been herein described and illustrated in relation to a preferred embodiment in which the cutting tips have a particular grooved configuration with concave recesses and convex protrusions, it will be understood by persons skilled in the art that the invention is not so limited. Instead, it is to be understood that cutting tips in accordance with the invention may comprise various other configurations with multiple locking surfaces of other configurations and locations which, when brazed to tip support portions of a saw blade body, form multiple mechanical locks effective in conjunction with one another to counteract multiple forces which act against the cutting tips in differing directions in the plane of the blade body during cutting operations. Thus, the present invention is intended and is to be construed as encompassing all such embodiments and not to be limited to the particular tip configuration illustrated in the drawings and described above, which is only representative of the invention.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A circular saw blade comprising:
    a substantially planar main body defining a rotational axis for cutting operation, the planar main body having an essentially circular periphery in which are formed a plurality of annularly spaced tip support portions which follow a generally circular path of travel upon rotation of the main body about the rotational axis, and
    a plurality of cutting tips affixed by brazing to the tip support portions of the main body,
    each tip support portion having a forward leading surface oriented generally radially relative to the rotational axis and having an adjacent shoulder surface oriented generally normal relative to the forward leading surface to extend generally in the circular path of travel,
    each cutting tip having a mounting base with a rearwardly facing surface configured to mate with the forward leading surface of a respective tip support portion and with an inwardly facing surface configured to mate with the shoulder surface of the respective tip support portion,
    each forward leading surface of a tip support portion having a protrusion projecting in the direction of the circular path of travel and engaged in a mating recess formed in the direction of the circular path of travel in the rearwardly facing surface of the respective cutting tip, the protrusion of the forward leading surface of the tip support portion being in the shape of a curvilinear convexity having a radius of between about 0.2 mm and about 1.0 mm, and the mating recess in the rearwardly facing surface of the cutting tip being in the shape of a curvilinear concavity having a radius substantially corresponding to the radius of the protrusion of the forward leading surface,
    each shoulder surface of a tip support portion having a recess formed generally radially inwardly with respect to the rotational axis and engaged by a mating protrusion projecting radially inwardly from the inwardly facing surface of the respective cutting tip, the protrusion of the inwardly facing surface of the cutting tip being in the shape of a curvilinear convexity having a radius of between about 0.2 mm and about 1.0 mm, and the recess in the shoulder surface of the tip support portion being in the shape of a curvilinear concavity having a radius substantially corresponding to the radius of the protrusion of the inwardly facing surface of the cutting tip,
    wherein the recesses and protrusions are formed in the plane of the blade and are of the same radius across substantially the entire planar depth of the blade,
    the brazing of the cutting tips to the tip support portions of the main body extending along the mating surfaces thereof and forming two respective mechanical locks between the protrusions and mating recesses, with one mechanical lock located generally radially relative to the rotational axis and the other mechanical lock located generally normal relative to the one mechanical lock to extend generally in the circular path of travel,
    each cutting tip having a cutting edge disposed generally opposite the two mechanical locks,
    the locations of the mechanical locks in relation to one another and to the main body counteracting multiple forces which act against the cutting tip in differing directions in the plane of the main body during rotational cutting operation of the blade.

* * * * *